Jan. 6, 1970     G. W. HONSBERGER     3,488,065

AUTOMOTIVE RUNNING AND STEERING GEAR

Filed Oct. 13, 1967

*INVENTOR.*
GILBERT W. HONSBERGER

United States Patent Office 3,488,065
Patented Jan. 6, 1970

3,488,065
AUTOMOTIVE RUNNING AND STEERING GEAR
Gilbert W. Honsberger, Danby, N.Y.
(Spencer, N.Y. 14883)
Filed Oct. 13, 1967, Ser. No. 675,754
Int. Cl. B60g *11/54, 11/05*
U.S. Cl. 280—96.2                     1 Claim

ABSTRACT OF THE DISCLOSURE

This invention relates generally to the basic frame, including the running gear and steering for automotive vehicles. The steering linkage is mounted within hollow suspension arms and a hollow front cross member.

---

Figure 1:
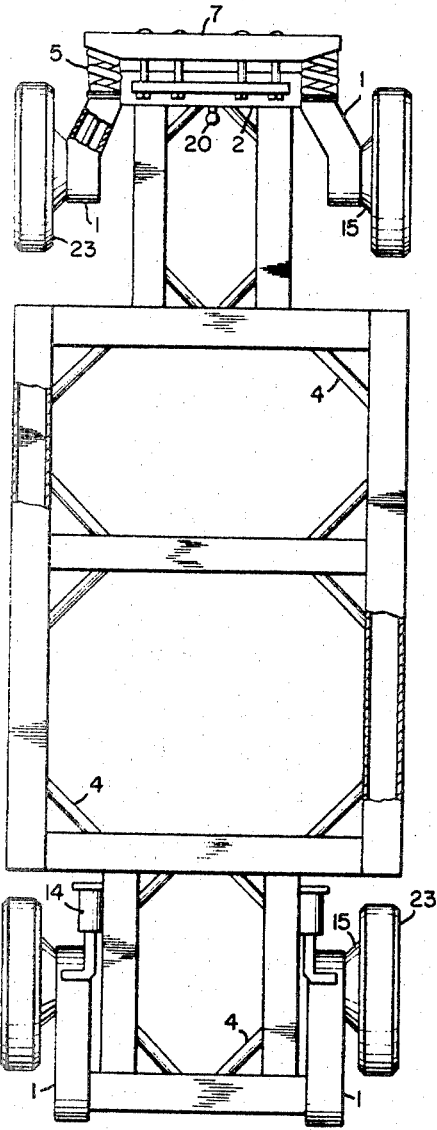

An object of this invention is to provide means to enclose all the necessary parts of the running and steering gear in hollow arms or other suitable cover and use hollow tubing in the frame.

Another object is to place the coil springs, or suitable counterpart, in a horizontal position to help reduce unsteady perch and pitch and serve as a secondary shock absorber to the bumpers assembly.

Another object is to place the steering rods and the road wheel arms on the same imaginary axis to help reduce friction and strain.

Another object is to achieve simplicity by attaching the hollow suspension arms in a longitudinal position, lengthways of the automotive vehicle, and to construct from standard parts such as bearings, ball joints, kingbolts, common bolts, threads and such items of craftsmen that are in general use and do not prevent application of improved parts.

In the drawing:

In the automotive chassis shown in the drawing is the running and steering gear for automotive vehicles, especially for an international automobile which could be made and used throughout the world in the same sizes and of uniform parts to help reduce the cost of manufacture, repairs and maintenance and add to the convenience, economy and safety of motoring.

Figure 2:
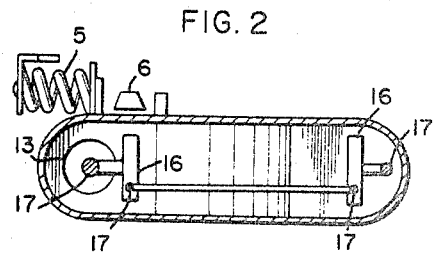
Figure 3:
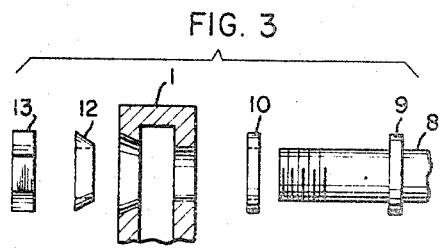
Figure 4:
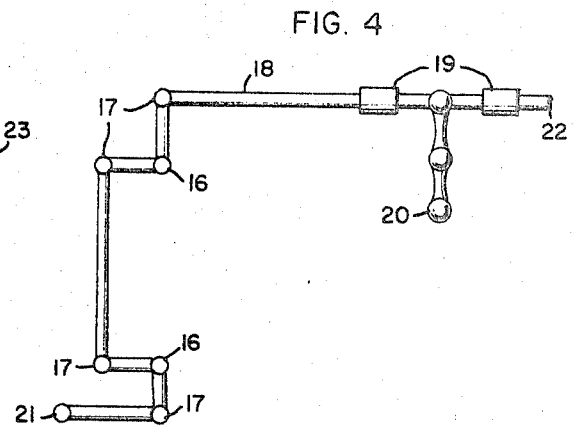

Drawing views: FIGURE 1 is a direct top view; FIGURE 2 is a side internal view of a suspension arm showing the steering linkage; FIGURE 3 is an exploded horizontal view of a suspension arm mounting; and FIGURE 4 is a top or horizontal view of left side and center steering linkage.

Referring to the drawings, each road wheel 23 is suspended individually by a hollow suspension arm 1. The front hollow suspension arms and frame cross member 2 contain the steering linkage and provide space for brake lines and other device. The rear hollow suspension arm and frame member 8 house the driving apparatus and provide space for the brake lines and other devices. The suspension arms are variable in external shape, and the bed structure of the chassis frame is flat and straight, with variations of arrangement permissible. Round and square tubing and solid bars and variations thereof may be used for construction. The main bed pieces of the frame may be used for extra gasoline storage. Skid rails may be used on the bottom to reduce obstacle and road collision damage. Angle 4 round and X bracing is used throughout. The bottom of the chassis is sealed with suitable material, with sealed service ports for oil changing and maintenance and other requirements.

The springs 5 of this automotive chassis function individually in a horizontal position from the suspension arms, and the thrust of road shock is partly converted from vertical to horizontal and absorbed by the motion and weight of the vehicle.

Shock absorbers may be used within the springs. Stops 6 for range of arm motion may be installed on top of the arm, FIGURE 2, or internally or any safe and convenient place. The spring system can be adjustable to auto load and also functions as a secondary shock absorber 7 for severe front and rear end collisions, as shown in FIGURE 1. Both, rear and front, spring assemblies are constructed on the same principle.

The movable suspension arms 1 attach to the rigid cross members of the frame and are each pivotally mounted on the cross members by a collar 9, frictional washer 10, tapered bearing 12, and fastener 13. Each suspension arm is equipped with a suitable stabilizer 14 to help absorb road shock and side strain and aid wheel alignment. A conventional type of road wheel attachment may be used, and the housing between the road wheels and suspension arms may be a solid part of the suspension arms or attached separately.

The steering linkage, shown in FIGURE 4, is contained in the front movable suspension arms and rigid frame cross member. Bell cranks and ball joint connections 17 are among the types of fittings that may be used. The connecting shaft 18 should be of torsion bar quality steel. An important, but excludable part of the steering linkage is the steel and rubber filled pistons 19 that absorb road shock and provide flexibility and tight thrust and pull. The connection 20 in FIGURE 4 extends to the steering wheel gear box, and connection 21 to the road wheel, and shaft 22 is a right side link member.

Service plates, doors and covers are applied in appropriate size and place. Flexible covers are used as required. Established lubrication methods are satisfactory.

This automotive chassis provides these advantages: sealed protection for steering linkage and other parts; to any given wheel base adds the total length of the suspension arms to the wheel base for better riding qualities (for example, an 18-inch arm, front and rear adds 36 inches to the riding qualities of the auto with some deductions for friction); for any given road clearance with any given overall body height, provides the maximum of passenger or cargo space; permits a stationary drive shaft; variable locations or types of engines or driving power are not prohibited; reduction of steering linkage wear; provides dual use of the spring system; and employs the steering and suspension system on the same imaginary axis.

What is claimed is:

1. In an automotive-running and steering gear, a sealed frame with two or more longitudinal pieces, with five or more cross members being located fore and aft, in the region of the engine wall, the front seat and the rear seat and with appropriate bracing; hollow suspension arms pivoting on said force and aft cross members and providing hollow housings, being attached to said fore and aft cross members on exterior portion of said cross members and having a generally horizontal position lengthways of the automotive vehicle to the attaching point of the road wheels; longitudinal coil springs or counterparts thereof mounted on said hollow suspension arms and engaging a movable transverse member which serves as a footing for said coil spring springs on the inside and as a secondary shock absorber footing for bumper assemblies on the outside; steering gear means inside said front cross member and suspension arms; and a suitable stabilizer for each of said suspension arms between the exterior walls thereof and the frame.

References Cited

UNITED STATES PATENTS

| | | | |
|---|---|---|---|
| 2,023,254 | 12/1935 | Stimson | 267—58 |
| 2,114,656 | 4/1938 | Maietta | 280—96.2 |
| 2,134,515 | 10/1938 | Hoskyns | 280—124 |
| 2,297,591 | 9/1942 | Urich | 280—96.2 X |
| 2,760,787 | 8/1956 | Muller | 267—20 X |
| 3,014,712 | 12/1961 | Reeves | 267—58 |

KENNETH H. BETTS, Primary Examiner

U.S. Cl. X.R.

267—20; 293—69; 280—106